(12) United States Patent
Zhang et al.

(10) Patent No.: US 6,390,122 B1
(45) Date of Patent: May 21, 2002

(54) FLUID FLOW CONTROL VALVE AND ORIFICE THEREFOR

(75) Inventors: GangFu Zhang, Gastonia; James H. M. Meyer, Dallas; Ben Gordon Arrowood, Jr., High Shoals, all of NC (US)

(73) Assignee: Hays Fluid Controls, a division of ROMAC Industries, Inc., Dallas, NC (US)

( * ) Notice: Subject to any disclaimer, the term of this patent is extended or adjusted under 35 U.S.C. 154(b) by 0 days.

(21) Appl. No.: 09/686,069

(22) Filed: Oct. 11, 2000

(51) Int. Cl.[7] .................................................. G05D 7/01
(52) U.S. Cl. ...................................... 137/517; 137/843
(58) Field of Search ................................ 137/517, 843; 138/43, 46

(56) References Cited

U.S. PATENT DOCUMENTS

| | | | | |
|---|---|---|---|---|
| 4,165,764 A | * | 8/1979 | Grandclement | 138/46 |
| 4,344,459 A | * | 8/1982 | Nelson | 138/46 |

* cited by examiner

Primary Examiner—Stephen M. Hepperle
(74) Attorney, Agent, or Firm—Alston & Bird LLP

(57) ABSTRACT

A fluid flow control valve comprises a housing defining a fluid flow passage extending longitudinally therethrough, the housing having opposite ends each defining an opening for flow into and out of the fluid flow passage, and an orifice and diaphragm disposed in the housing. The orifice has a seat at one end thereof facing the diaphragm. The diaphragm has one end face that opposes the seat of the orifice, the seat being configured such that one or more flow control passages are defined between the seat and the one end face of the diaphragm through which the fluid flows. The seat is contoured to include at least two different shapes of channels each promoting localized bending of the diaphragm at a different pressure differential, thereby permitting an expansion of the working pressure range to very low pressure differentials. The localized bending of the diaphragm can be modeled as a simple supported beam bending, which is well understood and readily predicted, thus making the prediction of the diaphragm movement more accurate than prediction of complex diaphragm deflections that occur in many prior flow control valves. Accordingly, the accuracy of the flow control valve can be improved over that of prior valves having complex diaphragm deflection modes.

36 Claims, 4 Drawing Sheets

FLUID FLOW CONTROL VALVE AND ORIFICE THEREFOR

FIELD OF THE INVENTION

The invention relates to fluid flow control valves. The invention relates more particularly to a fluid flow control valve having an orifice defining a seat against which an elastomeric diaphragm is urged by pressure differential occurring across the diaphragm such that fluid flows through flow control passages defined between the diaphragm and the seat, and in which increasing pressure differential across the diaphragm causes the diaphragm to constrict the flow control passages through deflection of the diaphragm.

BACKGROUND OF THE INVENTION

Fluid flow control valves of the above-described type are particularly used for regulating fluid flow to a substantially constant flow rate over a range of pressure differentials, such as about 0.1 bar to 10 bars. In such valves, the diaphragm typically comprises a solid body of elastomeric material. When urged against the seat of the orifice, the diaphragm deforms, the degree of deformation increasing with increasing pressure differential across the diaphragm. As the deformation of the diaphragm increases, the flow control passages between the diaphragm and the seat become smaller. The valve is designed such that over the range of pressure differentials of interest, the changing flow area of the flow control passages offsets the changing pressure differential so as to maintain the flow rate substantially constant.

A common type of flow control valve employs a "torpedo" shaped diaphragm that has an outer peripheral surface of smaller diameter than the inner surface of the housing of the valve. In normal forward flow through the valve, fluid flows between the outer peripheral surface of the diaphragm and the inner surface of the housing and then is turned radially inwardly by the orifice and flows through the flow control passages between an end face of the diaphragm and the orifice seat.

The flow rate through the flow control passages is proportional to the flow area of the passages multiplied by the square root of the pressure. Accordingly, the flow area of the flow control passages must change significantly from the lowest working pressure to the highest working pressure (e.g., from 0.1 bar to 10 bars) in order to maintain the flow rate substantially constant at all pressures. Various approaches have been taken to try to tailor the deflection of the diaphragm against the orifice seat so as to maintain approximately constant flow rate over the working pressure range. One prior approach employed a plurality of small projections of very small contact area on the orifice surface that engage the diaphragm in an attempt to increase the flow area at the low end of the pressure range. At low pressure differential, as the pressure differential increases the projections press into the diaphragm and locally deform it and the face of the diaphragm moves closer to the main surface of the orifice seat. A drawback of this approach is that the very small contact area of the projections causes a significant hysteresis effect. The valve also tends to have higher than desired flow in the pressure range where the diaphragm deflection makes a transition from local deformation to bending.

Another prior approach was to limit the deflection of the diaphragm to pure compression without bending, as shown in U.S. Pat. No. 3,189,125. This was accomplished by making the diaphragm of sufficient thickness and shaping the diaphragm to have its thickest section at the center so that substantially no bending would occur. This approach works well for differential pressures exceeding 1.0 bar. However, when the operating rang,e is expanded to include pressure differentials below 1.0 bar, problems begin to arise.

Other prior devices have employed annular washer-type diaphragms that bend as the pressure differential increases, thus changing the flow area through the center of the diaphragm, as shown in U.S. Pat. No. 4,986,312. These devices are prone to excessive bending-beam creeping and, thus, inaccuracy over time.

Another disadvantage of many prior flow control valves is that during reverse flow through the valve, such as when backflushing a fluid system, the valve may not allow fluid to freely pass in the reverse direction, and the diaphragm in some valves may even become dislodged from its proper position.

SUMMARY OF THE INVENTION

The present invention provides a fluid flow control valve comprising a housing defining a fluid flow passage extending therethrough, the housing having opposite ends each defining an opening for flow into and out of the fluid flow passage, and an orifice and diaphragm disposed in the housing. The orifice has a seat at one end thereof. The diaphragm has one end face that opposes the scat of the orifice, the seat being configured such that one or more flow control passages are defined between the seat and the one end face of the diaphragm through which the fluid flows. In accordance with the invention, the seat is contoured to include at least two different shapes of channels each promoting localized bending of the diaphragm at a different pressure differential, thereby permitting an expansion of the working pressure range to very low pressure differentials. The localized bending of the diaphragm can be modeled as a simple supported beam bending, which is well understood and readily predicted, thus making the prediction of the diaphragm movement more accurate than prediction of complex diaphragm deflections that occur in many prior flow control valves. Accordingly, the accuracy of the flow control valve can be improved over that of prior valves having complex diaphragm deflection modes.

In accordance with a preferred embodiment of the invention, the seat of the orifice has a main support surface defining a plurality of channels therein including at least one relatively wide channel promoting localized bending of the diaphragm thereinto at a relatively low pressure differential range, and at least one relatively narrow channel promoting localized bending of the diaphragm thereinto at a relatively higher pressure differential range, each channel extending in a transverse direction of the orifice and the channels being circumferentially spaced from each other.

The channels preferably have a V-shaped cross section normal to the transverse direction. The walls defining the channel can be planar or non-planar. One or more of the channels can include a longitudinal slot formed at the bottom of the channel. The slot preferably is engaged by and begins to be constricted by the diaphragm after the channel has been completely closed off by the diaphragm. The slot thus functions as a third type of channel regulating flow rate at a third range of pressure differentials higher than that of the wide and narrow converging channels.

In accordance with another preferred embodiment of the invention, the orifice includes a plurality of spaced protrusions that extend beyond the main support surface in the direction toward the diaphragm. The protrusions engage the diaphragm and hold it off the main support surface at low pressure differentials. The protrusions preferably are sized in contact area and are spaced in relation to the diaphragm so as to promote bending of the diaphragm between the protrusions. Between each two adjacent protrusions there preferably is at least one of the channels. Thus, at low pressure differentials, the diaphragm bends between the protrusions, eventually coming into contact with the main support surface on either side of the channel(s) as the pressure differential increases to a predetermined magnitude. Further increases in the pressure differential then cause the diaphragm to bend into the channel(s). Each channel will be completely closed off by the diaphragm when the pressure differential becomes large enough, the wide channels becoming closed at a lower pressure differential than the narrow channels. The diaphragm preferably has sufficient rigidity, through careful selection of its length-to-diameter ratio and durometer hardness, to permit the localized bending of the diaphragm into the channels while substantially reducing the creep of the diaphragm over time. Preferably, the diaphragm has a length-to-diameter ratio from about 0.1:1 to about 0.47: 1, and a Shore A durometer hardness from about 55 to about 69.

In a preferred arrangement of the channels, there are at least two of the relatively wide channels located immediately adjacent each other so as to define therebetween a diaphragm-engaging surface of inverted V-shaped cross section tapering toward the diaphragm. Still more preferably, there are four of the relatively wide channels arranged in two pairs, the channels of each pair being immediately adjacent each other so as to define therebetween a diaphragm-engaging surface of inverted V-shaped cross section tapering toward the diaphragm. The two diaphragm-engaging surfaces of inverted V-shaped cross section preferably are on diametrically opposite sides of the longitudinal axis of the orifice. The four protrusions preferably are arranged in two pairs, the protrusions of each pair having one of the pairs of relatively wide channels located therebetween. The seat preferably includes two of the relatively narrow channels spaced about 90° from the diaphragm-engaging surfaces of inverted V-shaped cross section. Each of the relatively narrow channels is defined in a portion of the main support surface that is normal to the longitudinal axis of the orifice.

BRIEF DESCRIPTION OF THE DRAWINGS

The above and other objects, features, and advantages of the invention will become more apparent from the following description of certain preferred embodiments thereof, when taken in conjunction with the accompanying drawings in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
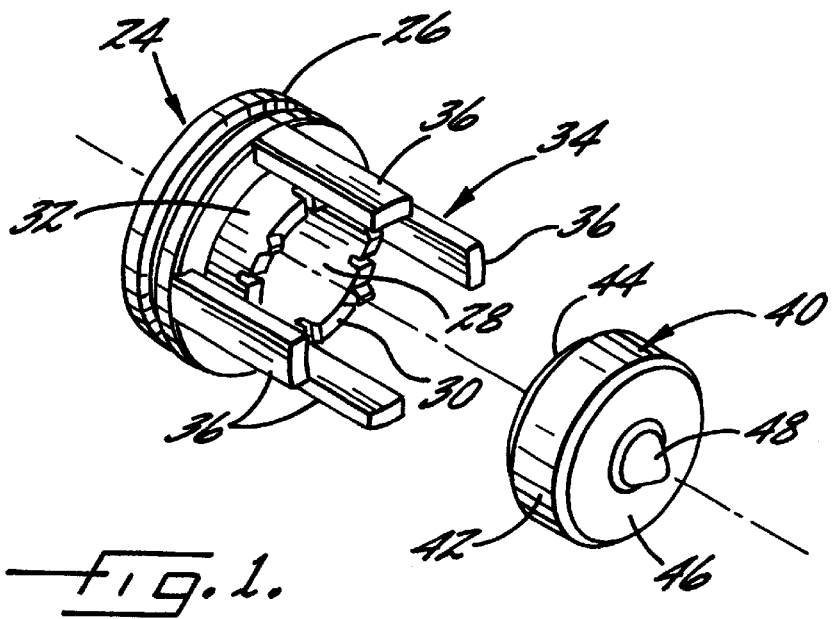
FIG. 1 is an exploded perspective view of an orifice and a diaphragm in accordance with one embodiment of the invention.
Figure 2:
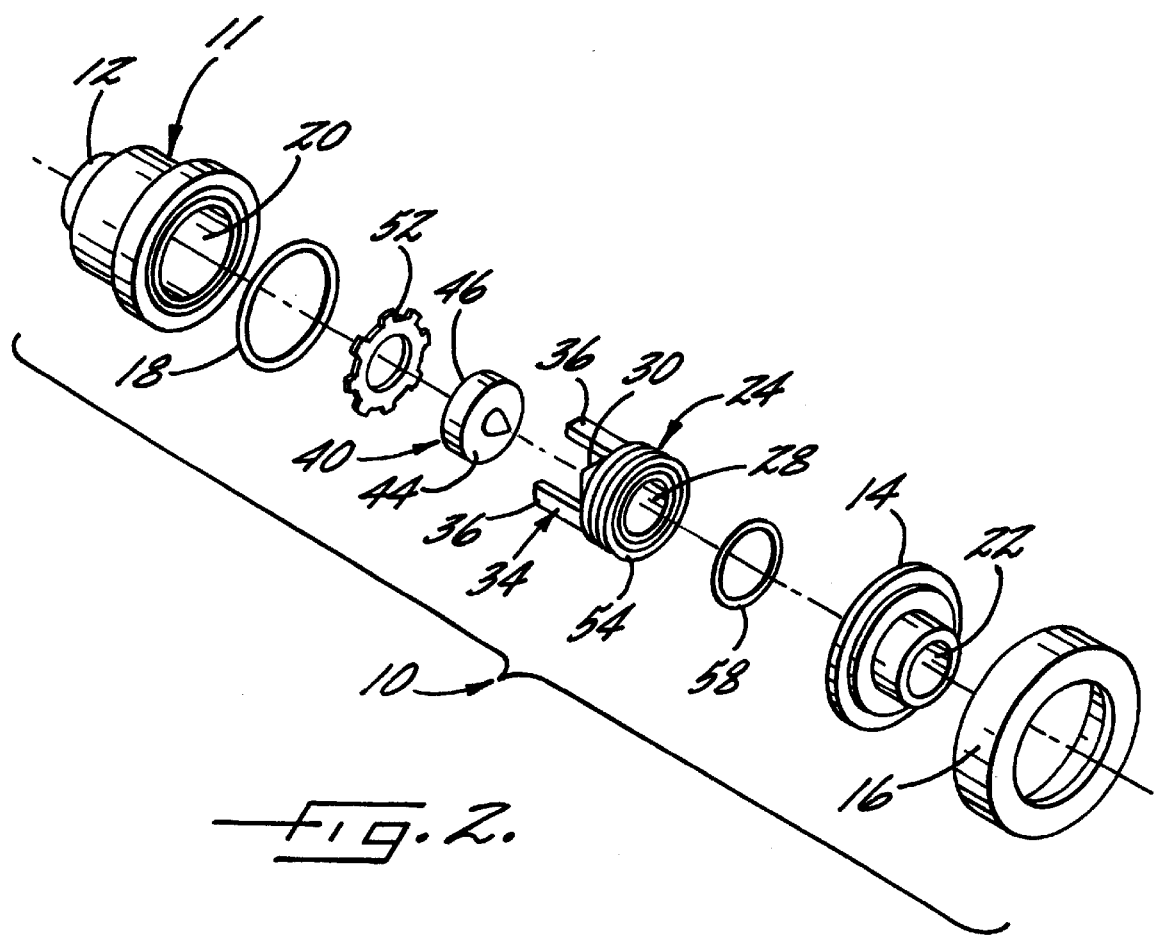
FIG. 2 is an exploded perspective view of a fluid flow control valve in accordance with a preferred embodiment of the invention.
Figure 3:
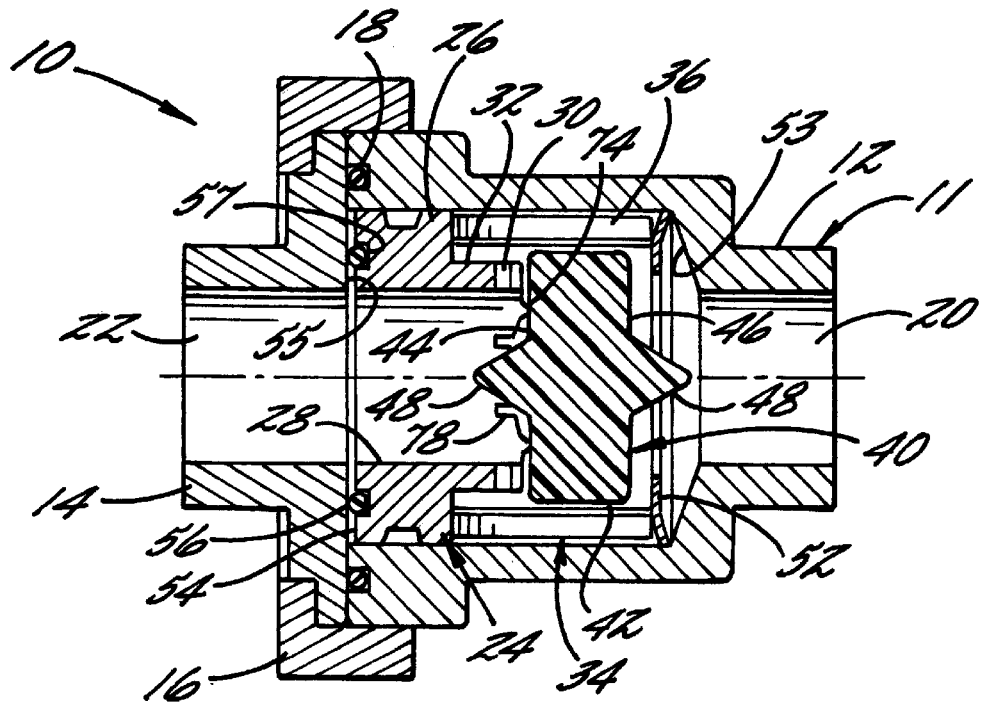
FIG. 3 is a cross-sectional view of the assembled valve along a plane through the longitudinal centerline of the valve.

FIGS. 1–3 depict a fluid flow control valve 10 in accordance with one preferred embodiment of the invention. The valve 10 includes a housing 11 formed by an inlet housing 12, an outlet housing 14, and a cap nut 16 that is internally threaded and screws onto an externally threaded end of the inlet housing 12 so as to compress the outlet housing 14 against a sealing surface of the inlet housing 12 with a seal 18 disposed therebetween so as to seal the housing. The housing thus forms a generally tubular structure with a longitudinal fluid flow passage extending therethrough from an inlet end defined by the inlet housing 12 to an outlet end defined by the outlet housing 14. The terms "inlet" and "outlet", and corresponding terms "upstream" and "downstream" are used in the present specification and claims with reference to a normal forward direction of fluid flow through the valve 10 in which the flow rate is to be controlled in a desired manner. It will be understood, however, that the valve 10 is also capable of passing fluid in a reverse direction, i.e., from the "outlet" end to the "inlet" end.

The inlet housing 12 thus defines an inlet port 20 and the outlet housing 14 defines an outlet port 22 for fluid flow. The inlet and outlet ends of the housing are configured to be attached in any suitable manner to fluid-conducting conduits.

An orifice 24 is disposed within the flow passage of the housing. The orifice 24 includes a generally tubular outer wall or support portion 26 having a diameter slightly less than that of the inner surface of the housing, and having a central flow passage 28 therethrough. A seat 30 is defined by the orifice 24 at an upstream end thereof. The seat 30 is formed on a tubular portion 32 (FIG. 2) of the orifice having a smaller diameter than that of the tubular support portion 26 and joined to the tubular support portion concentrically therewith. The orifice 24 in the illustrated embodiment also includes an integral spider 34 having a plurality of legs 36 integrally formed with the tubular support portion 26 of the orifice. The legs 36 are circumferentially spaced from one another and extend from the tubular support portion 26 in the upstream direction beyond the seat 30 of the orifice. Four legs 36 are shown in the illustrated embodiment, spaced 90° apart, but it will be understood that a different number of legs can be used if desired. The legs comprise generally beam-shaped members in the illustrated embodiment, but other shapes can be used instead. Although an integral spider is shown in the drawings, it will be understood that a separate spider or other type of device can be used for holding the diaphragm in its proper position and orientation relative to the orifice.

The valve 10 also includes a diaphragm 40 that acts in conjunction with the orifice 24 to control the rate of fluid flow through the valve in the forward direction. The diaphragm comprises a solid disc-shaped piece of elastomeric material. The outer peripheral surface 42 of the diaphragm is substantially cylindrical and has a diameter sized to allow the diaphragm to fit between the legs 36 of the integral spider and orifice. Preferably, there is sufficient radial clearance between the diaphragm and the legs to allow the diaphragm to freely move axially in the upstream and downstream directions. The diaphragm 40 has opposite end faces 44 and 46 preferably formed identically to each other, and advantageously formed as planar surfaces. Alternatively, the end faces 44 and 46 could be conical, spherical, or shaped as some other surface of a body of revolution, such that the diaphragm can be rotated about its axis without affecting the interface between the diaphragm and the seat 30 of the orifice. Each of the end faces 44, 46 of the diaphragm can have a flow-straightening cone 48 formed thereon. Thus, if the face against the seat 30 becomes permanently deformed or worn after prolonged use, the diaphragm 40 can be reversed so that the other face is against the seat, thus extending the useful life of the diaphragm.

Forward fluid flow through the valve 10 causes the diaphragm 40 to be moved against the seat 30 of the orifice. The legs 36 of the integral spider align the diaphragm in the radial direction so that the end face 44 of the diaphragm contacts the seat 30 about its entire circumference. The legs 36 also space the diaphragm away from the inner surface of the housing so that a consistent and predictable flow passage exists between the outer peripheral surface 42 of the diaphragm and the inner surface of the housing. The fluid flows through this flow passage, and then is turned by the tubular support portion 26 of the orifice so as to flow radially inwardly and then through flow control passages defined between the end face 44 of the diaphragm and the seat 30, and finally out the central passage 28 of the orifice and out the outlet port 22 of the housing. The seat 30 is contoured to be non-planar and can include, for example, grooves or channels. As the pressure differential across the diaphragm increases, the diaphragm is pressed with greater and greater pressure against the seat 30 and deforms so as to conform to a greater and greater extent with the contour of the seat. Accordingly, the flow passages between the diaphragm and seat become smaller and smaller, which compensates for the increasing pressure differential so as to maintain the flow rate through the valve substantially constant, at least over a limited range of pressure differentials. such as about 0.1 bar to 10 bars.

The valve 10 further includes a diaphragm stop member 52 for limiting the extent to which the diaphragm can move axially away from the seat 30 during reverse flow through the valve. The stop member 52 preferably comprises a spring element that is seated against a radial shoulder 53 formed on the inlet housing 12 and biases the legs 36 of the orifice toward the outlet housing 14, thereby urging the end face 54 of the orifice against an opposing radial shoulder 55 of the outlet housing 14. A seal 56 is disposed between these surfaces to seal the connection between the orifice and the outlet housing. The end face 54 of the orifice includes a groove 57 for retaining the seal 56. The stop member 52 in the illustrated embodiment is a spring finger washer. Flow passages are defined between the fingers of the washer and between the ring of the washer and the inner surface of the housing for reverse flow of fluid. During forward flow, the central aperture of the washer is not blocked by the diaphragm as it is in reverse flow, and thus the washer presents no substantial flow restriction during forward flow.

In accordance with the present invention, the seat 30 of the orifice is contoured to provide at least two different shapes of channels between the diaphragm 40 and the seat, each shape being tailored to regulate flow at a different range of pressure differentials from the other channel shape(s). Moreover, the seat and the diaphragm are designed to promote simple supported beam-like bending of the diaphragm into the channels, as opposed to a local deformation of very small projections into the diaphragm or a complex bending of an annular washer-type diaphragm as in some prior flow control valves. Thus, the deflection of the diaphragm can be predicted with good accuracy, enabling more-accurate control of the sizes of the flow passages at various pressure differentials.

Figure 4:
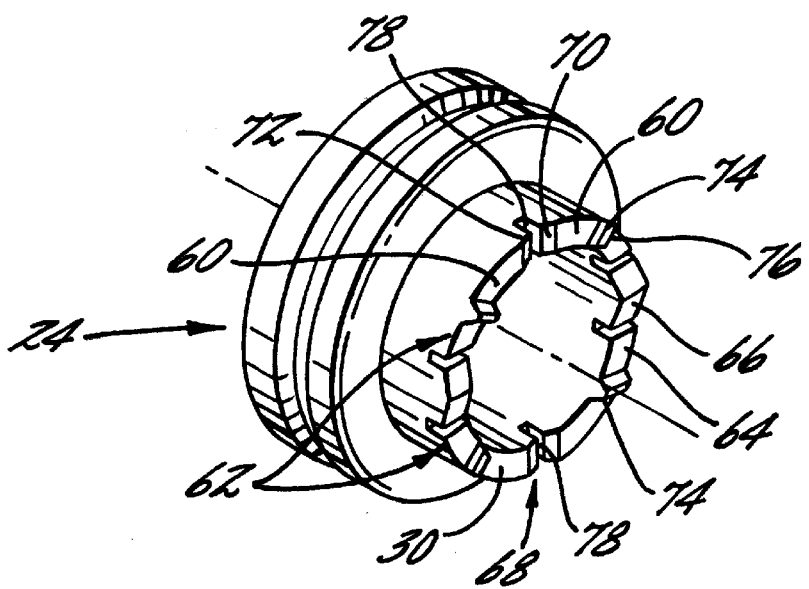
FIG. 4 is a perspective view of an orifice in accordance with the invention shown without the spider, depicting the flow control surfaces of the orifice seat in greater detail.

FIG. 4 depicts a detailed view of the orifice 24 and seat 30 in accordance with one preferred embodiment of the invention. The seat 30 includes a main support surface 60 that is normal to the longitudinal axis of the orifice. In the main support surface 60 a plurality of channels are formed, each channel extending along a direction transverse to the longitudinal axis of the orifice. The channels include at least one relatively wide channel 62 formed by converging walls 64 and 66 of relatively shallow slope. The walls 64 and 66 converge in the downstream direction parallel to the longitudinal axis of the orifice, thus forming a V-shaped channel 62. In the illustrated embodiment, there are four of the wide channels 62 spaced about the circumference of the seat 30 and arranged in two side-by-side pairs located on diametrically opposite sides of the longitudinal axis of the orifice. The main support surface of the orifice seat also defines at least one relatively narrow channel 68 formed by converging walls 70 and 72 of relatively steep slope. The walls 70 and 72 converge in the downstream direction, thus forming a V-shaped channel 68. In the illustrated embodiment, there are two of the narrow channels 68 located diametrically opposite from each other and spaced about 90° from the pairs of wide channels 62.

The orifice seat also has a plurality of protrusions 74 formed on it and extending upstream of the main support surface 60 of the seat. The protrusions 74 have contact faces 76 that contact the end face 44 of the diaphragm. As shown in FIG. 3, the protrusions 72 engage the end face 44 of the diaphragm 40 so as to hold the end face 44 off the main support surface of the seat at low pressure differentials. In the illustrated embodiment, there are four of the protrusions 72 spaced about 90° apart from one another. The orifice 24 also has a longitudinal slot 78 formed in the bottom of one, some, or all of the channels 62 and 68, the illustrated embodiment having a slot 78 in each of the channels.

Figure 5:
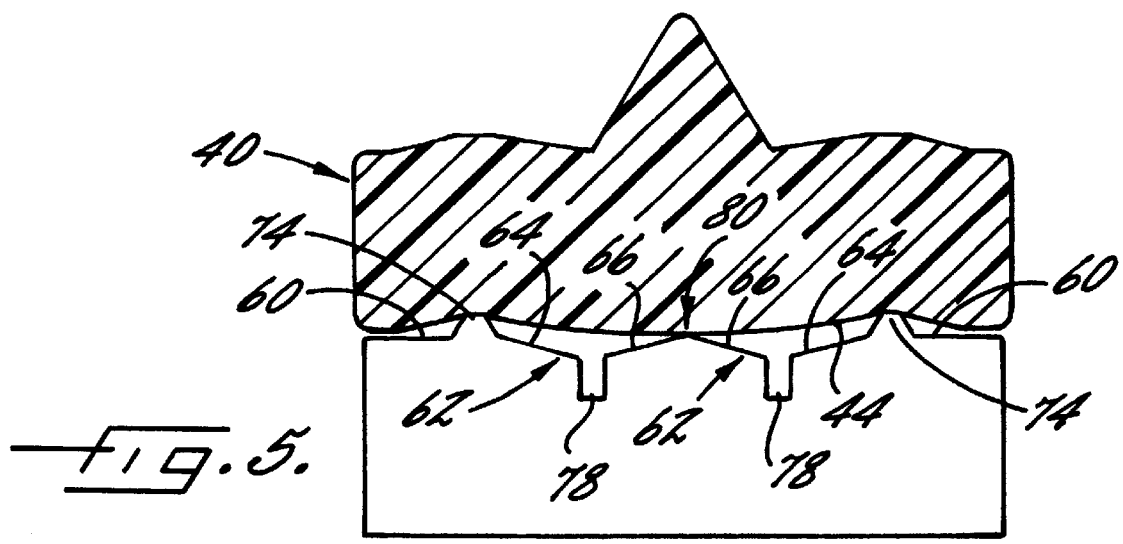
FIG. 5 is a magnified side elevation of the orifice and diaphragm, showing bending of the diaphragm into a pair of the relatively wide channels at a low pressure differential.
Figure 6:
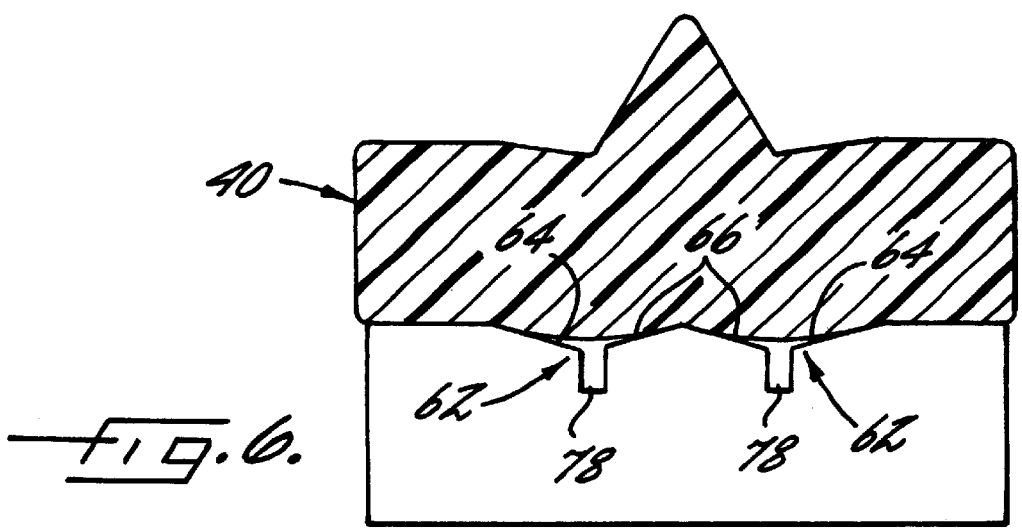
FIG. 6 is a view similar to FIG. 5 at an intermediate pressure differential.
Figure 7:
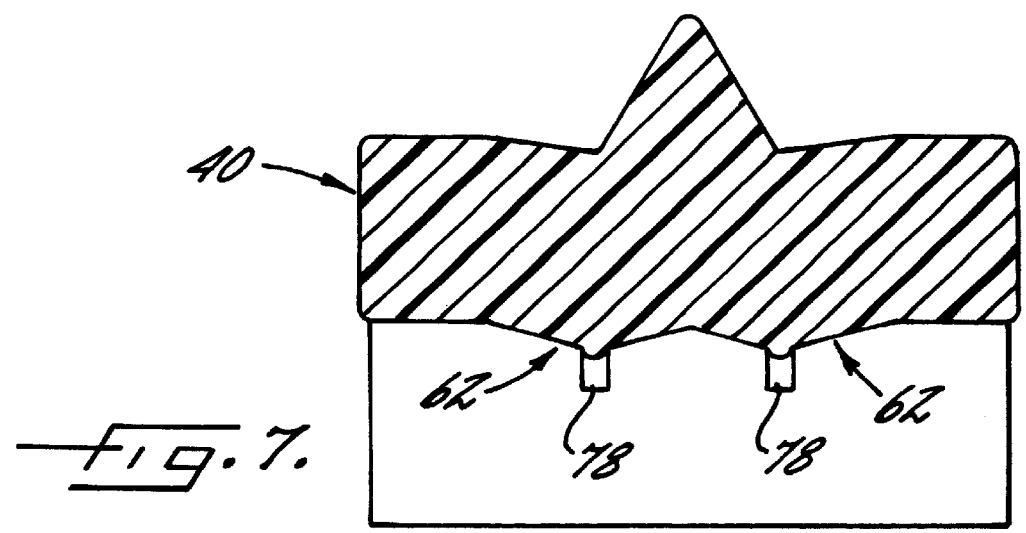
FIG. 7 is a view similar to FIGS. 5 and 6 at a high pressure differential.

In accordance with the invention, the channels 62. 68, the protrusions 74, and the diaphragm 40 are designed so as to cooperatively act to promote simple supported beam-type bending of the diaphragm between the protrusions 74 and into the channels as the pressure differential across the valve increases. FIGS. 5 through 10 are illustrative of the bending of the diaphragm that occurs at various pressure differentials. FIGS. 5, 6, and 7 show what occurs between two adjacent protrusions 74 located on opposite sides of an adjacent pair of the wide channels 62 at low, intermediate, and high pressure differentials, respectively. At a low pressure differential, such as below about 0.4 bar, the diaphragm 40 bends between the protrusions 74 and is held off the surfaces 64, 66 of the channels 62 by the protrusions; FIG. 5 shows the situation at a pressure differential when the diaphragm just makes contact with the main support surface of the seat at a location between the two adjacent wide channels 62. More particularly, between the two channels 62 an inverted V-shaped diaphragm-engaging surface 80 is formed by the oppositely inclined walls 66 of the two channels. This diaphragm-engaging surface 80 acts as a third support point such that beam-like bending occurs between one protrusion 72 and the surface 80, and between the surface 80 and the other protrusion 74. Fluid flows through the flow control passages defined between the diaphragm and the surfaces of the channels 62.

As the pressure differential is increased to an intermediate level as shown in FIG. 6, the diaphragm bends into the channels 62 and seats against the surfaces 64, 66. At a predetermined pressure differential, the protrusions 74 will be fully enveloped by the diaphragm, as shown in FIG. 6, and thereafter will cease to affect the flow rate through the valve as pressure differential is further increased. The diaphragm progressively bends to a greater and greater extent so as to seat against more and more of the channel surfaces 64, 66 as pressure differential is increased, until a pressure differential is reached at which the diaphragm makes full contact with the entire surfaces 64, 66 and begins to engage the slots 78 in the bottoms of the channels 62, as shown in FIG. 7. Preferably, this initial engagement of the slots 78 occurs near the upper end of the working range of pressure differentials for the valve.

Figure 8:
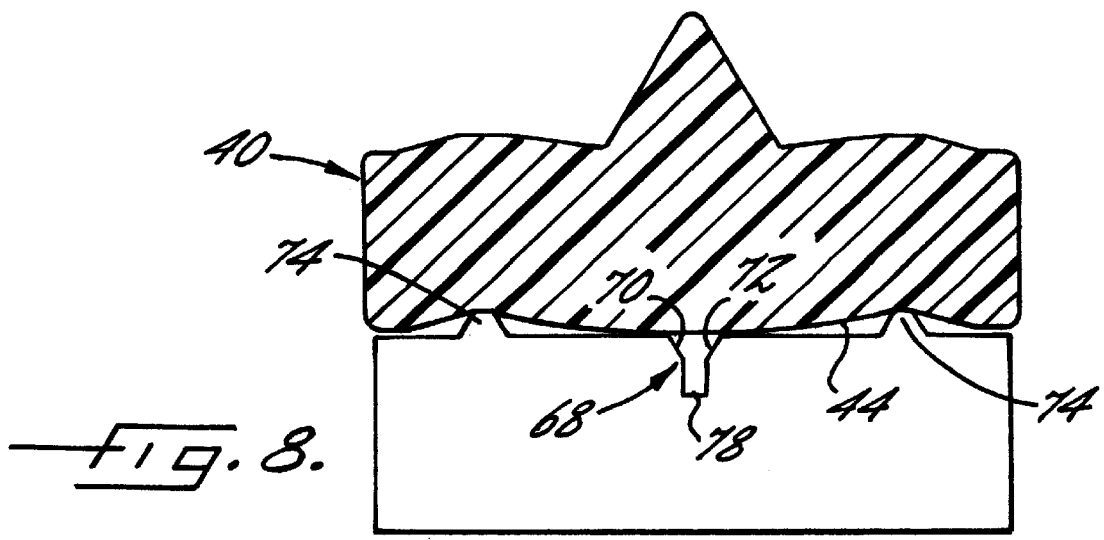
FIG. 8 is a magnified side elevation of the orifice and diaphragm, showing bending of the diaphragm into one of the relatively narrow channels at a low pressure differential.
Figure 9:
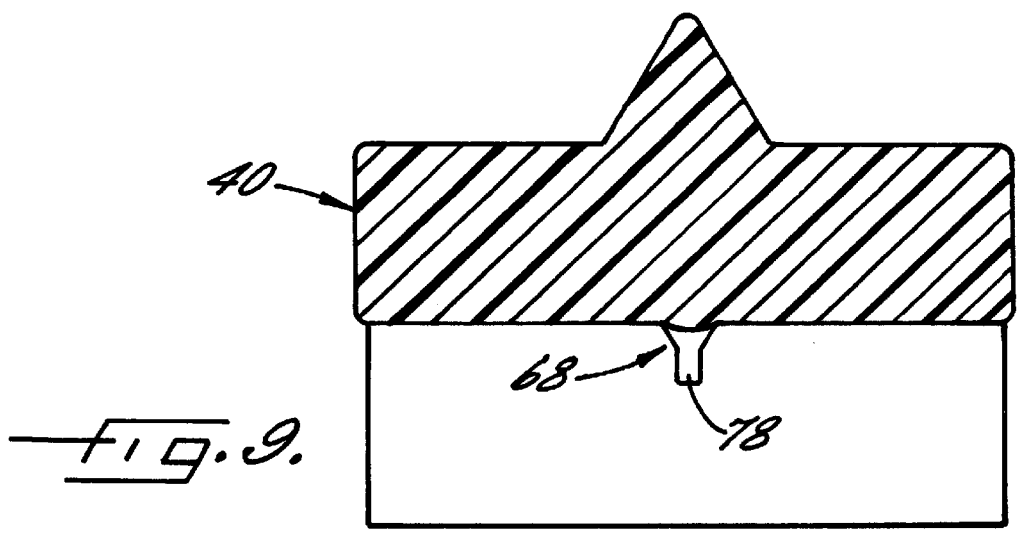
FIG. 9 is a view similar to FIG. 8 at an intermediate pressure differential.
Figure 10:
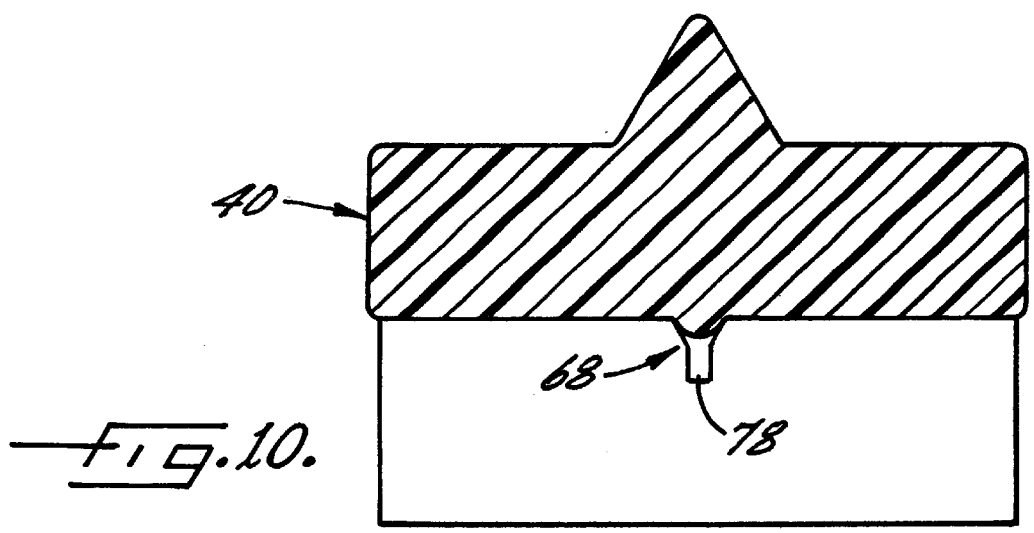
FIG. 10 is a view similar to FIGS. 8 and 9 at a high pressure differential.

FIGS. 8, 9, and 10 show low, intermediate, and high pressure differential conditions, respectively, for one of the narrow channels 68 in the orifice seat. At a low pressure differential, the diaphragm is supported and held off the main support surface of the orifice seat by the protrusions 74, and bends between the protrusions until, at a predetermined pressure differential, the diaphragm begins to settle on the main support surface on either side of the channel 68 as shown in FIG. 8. As the pressure differential is further increased, the protrusions 74 become fully enveloped by the diaphragm and the diaphragm makes contact with the entire main support surface of the seat on either side of the channel 68 and begins to bend or deform into the channel as shown in FIG. 9. Still further increase in pressure differential causes the diaphragm to begin to fill in the channel 68 as the diaphragm begins to engage the walls 70 and 72 as in FIG. 10. Preferably, the wide channels 62 are configured to be fully closed by the diaphragm at a pressure differential of about 1.2 bars, and the relatively narrow channels 68 are configured to be fully closed by the diaphragm at a pressure differential of about 3 bars.

The invention thus enables the flow rate to be accurately predicted over a wide range of pressure differentials, such as 0.1 bar to 10 bars, because the deflection of the diaphragm is characterized by beam-like bending, which can be readily modeled and predicted. In order to promote bending of the diaphragm as opposed to local deformation, the protrusions 74 and surfaces of the orifice seat and the diaphragm are designed so that the protrusions are capable of supporting the forces for bending the diaphragm without being prematurely enveloped by the diaphragm. That is, if the contact faces 76 of the protrusions were too small, the protrusions would tend to locally press into and deform the diaphragm with relatively little force on the diaphragm and thus the diaphragm would not bend to any significant extent. It will also be appreciated that the force required to bend the diaphragm a given amount depends on the stiffness of the diaphragm, which is indicated by the Shore A durometer hardness of the material, and the length-to-diameter ratio of the diaphragm. Thus, the larger the durometer hardness, the less the diaphragm will bend for a given force or pressure differential, all other factors being equal; likewise, the greater the length-to-diameter ratio of the diaphragm, the less the diaphragm will bend for a given force or pressure differential. To promote bending of the diaphragm, all of these variables must be taken into account. It will also be understood that there is a lower limit to how easily bendable the diaphragm can be made for a variety of reasons including durability and the desire to minimize long-term creep of the diaphragm.

Although no general rule of thumb can be given for the selection of the diaphragm length-to-diameter ratio, diaphragm durometer hardness, and contact areas for the protrusions that will be universally applicable in all cases, in general the length-to-diameter ratio preferably should be about 0.1:1 to about 0.47:1. The Shore A durometer hardness of the diaphragm preferably should be about 55 to 69. Of course, in other applications these variables can be manipulated in different ways such that they may not necessarily fall within these ranges; thus, these ranges are given solely by way of non-limiting example. The height of the protrusions 74, the spacing distance between the protrusions, and the surface area of their contact faces 76 in general can be determined by mathematically modeling the beam-type bending of the diaphragm between the protrusions, such that the protrusions are suitably shaped to support bending forces required to bend the diaphragm.

Many modifications and other embodiments of the invention will come to mind to one skilled in the art to which this invention pertains having the benefit of the teachings presented in the foregoing descriptions and the associated drawings. For example, although the valve 10 shown and described above has the orifice arranged in the housing such that the central longitudinal axis of the orifice is parallel with the main flow direction through the housing, in other types of valves the orifice may be oriented with its axis non-parallel to the main flow direction, and even at 90° to the main flow direction. Thus, the invention is not limited to any particular orifice orientation. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A fluid flow control valve, comprising:

a housing defining a fluid flow passage extending therethrough, the housing having openings for flow into and out of the fluid flow passage;

an orifice disposed in the fluid flow passage of the housing, the orifice having a seat at one end thereof; and a deformable and bendable elastomeric diaphragm disposed in the fluid flow passage of the housing, the diaphragm having one end face that is urged against the seat of the orifice by fluid flow through the valve, the seat having a main support surface defining a plurality of channels therein including at least one relatively wide channel promoting, localized bending of the diaphragm thereinto at a relatively low pressure differential range, and at least one relatively narrow channel promoting localized bending of the diaphragm thereinto at a relatively higher pressure differential range, each channel extending in a transverse direction of the orifice and the channels being circumferentially spaced from each other such that the diaphragm locally bends into each narrow channel separately from the diaphragm's local bending into each wide channel.

2. The fluid flow control valve of claim 1, further comprising a slot formed in a bottom of one or more of the channels and extending in a direction generally away from the diaphragm.

3. The fluid flow control valve of claim 1, further comprising a slot formed in a bottom of each of the channels and extending in a direction generally away from the diaphragm.

4. The fluid flow control valve of claim 1, wherein there are at least two of the relatively wide channels located immediately adjacent each other so as to define therebetween a diaphragm-engaging surface of inverted V-shaped cross section tapering in a direction toward the diaphragm.

5. The fluid flow control valve of claim 1, wherein there are four of the relatively wide channels arranged in two pairs, the channels of each said pair being immediately adjacent each other so as to define therebetween a diaphragm-engaging surface of inverted V-shaped cross section tapering in a direction toward the diaphragm.

6. The fluid flow control valve of claim 5, wherein the diaphragm-engaging surfaces of inverted V-shaped cross section are on diametrically opposite sides of the longitudinal axis of the orifice.

7. The fluid flow control valve of claim 6, further comprising four spaced protrusions formed on the seat and extending beyond the main support surface in a direction toward the diaphragm for contacting the diaphragm and holding the diaphragm off the main support surface at low pressure differentials wherein the four protrusions are arranged in two pairs, the protrusions of each said pair having one of the pairs of relatively wide channels located therebetween.

8. The fluid flow control valve of claim 7, wherein there are two of the relatively narrow channels.

9. The fluid flow control valve of claim 8, wherein the relatively narrow channels are spaced about 90° from the diaphragm-engaging surfaces of inverted V-shaped cross section.

10. The fluid flow control valve of claim 8, wherein each of the relatively narrow channels is defined in a portion of the main support surface that is normal to the longitudinal axis of the orifice.

11. The fluid flow control valve of claim 1, wherein the channels are of V-shaped cross section.

12. The fluid flow control valve of claim 11, wherein there are two of the relatively narrow channels located diametrically opposite from each other.

13. The fluid flow control valve of claim 12, wherein there are at least two of the relatively wide channels located on opposite sides of the longitudinal axis from each other.

14. The fluid flow control valve of claim 13, wherein the relatively wide channels are spaced about 90° from the relatively narrow channels.

15. The fluid flow control valve of claim 12, wherein there are two pairs of the relatively wide channels.

16. The fluid flow control valve of claim 1, further comprising a plurality of spaced protrusions formed on the orifice seat extending beyond the main support surface thereof in a direction toward the diaphragm, the protrusions holding the diaphragm off the main support surface and having sufficient contact areas with the diaphragm to support bending forces that deflect the diaphragm in bending between the protrusions at differential pressures of about 0.1 bar to 0.4 bar, the diaphragm fully enveloping the protrusions at about 0.4 bar pressure differential such that above about 0.4 bar pressure differential the protrusions cease to affect the flow rate through the valve.

17. The fluid flow control valve of claim 16, wherein the at least one relatively wide channel is configured to be fully closed by the diaphragm at about 1.2 bar pressure differential, and the at least one relatively narrow channel is configured to be fully closed by the diaphragm at about 3 bars pressure differential.

18. An orifice for a fluid flow control valve having a diaphragm that is urged against a seat of the orifice by fluid flow through the valve, the orifice comprising:
a tubular support portion defining the seat at one end thereof, the seat being encircling a central longitudinal axis of the orifice, the seat having a main support surface defining a plurality of channels therein including at least one relatively wide channel promoting localized bending of the diaphragm thereinto at a relatively low pressure differential range, and at least one relatively narrow channel promoting localized bending of the diaphragm thereinto at a relatively higher pressure differential range, each channel extending in a transverse direction of the orifice and the channels being circumferentially spaced from each other such that the diaphragm locally bends into each narrow channel separately from the diaphragm's local bending into each wide channel.

19. The orifice of claim 18, further comprising a slot formed in a bottom of one or more of the channels and extending in a direction generally away from the seat.

20. The orifice of claim 18, further comprising a longitudinally extending slot formed in a bottom of each of the channels and extending in a direction generally away from the seat.

21. The orifice of claim 18, wherein there are at least two of the relatively wide channels located immediately adjacent each other so as to define therebetween a diaphragm-engaging surface of inverted V-shaped cross section tapering in a direction toward the diaphragm.

22. The orifice of claim 18, wherein there are four of the relatively wide channels arranged in two pairs, the channels of each said pair being immediately adjacent each other so as to define therebetween a diaphragm-engaging surface of inverted V-shaped cross section tapering in a direction toward the diaphragm.

23. The orifice of claim 22, wherein the diaphragm-engaging surfaces of inverted V-shaped cross section are diametrically opposite from each other.

24. The orifice of claim 23, further comprising four spaced protrusions formed on the seat and extending beyond the main support surface in a direction toward the diaphragm for contacting the diaphragm and holding the diaphragm off the main support surface at low pressure differentials, wherein the four protrusions are arranged in two pairs, the protrusions of each said pair having one of the pairs of relatively wide channels located therebetween.

25. The orifice of claim 24, wherein there are two of the relatively narrow channels.

26. The orifice of claim 25, wherein the relatively narrow channels are spaced about 90° from the diaphragm-engaging surfaces of inverted V-shaped cross section.

27. The orifice of claim 25, wherein each of the relatively narrow channels is defined in a portion of the main support surface that is normal to the longitudinal axis of the orifice.

28. The orifice of claim 18, wherein the channels are of V-shaped cross section.

29. The orifice of claim 28, wherein there are two of the relatively narrow channels located diametrically opposite from each other.

30. The orifice of claim 29, wherein there are at least two of the relatively wide channels located on opposite sides of the longitudinal axis from each other.

31. The orifice of claim 30, wherein the relatively wide channels are spaced about 90° from the relatively narrow channels.

32. The orifice of claim 29, wherein there are two pairs of the relatively wide channels.

33. The orifice of claim 18, further comprising a spider formed integrally with the orifice as a one-piece construction, the spider including a plurality of circumferentially spaced legs extending from the orifice beyond the seat in a direction toward the diaphragm, the legs receiving the diaphragm therebetween and radially aligning the diaphragm with the seat.

34. The orifice of claim 18, in combination with a diaphragm, the diaphragm having opposite end faces of identical contour such that either end face of the diaphragm can engage the seat of the orifice.

35. The orifice of claim 18, in combination with a diaphragm, the diaphragm comprising a solid cylindrical body having a length to diameter ratio from about 0.1:1 to about 0.47:1, and a Shore A durometer hardness from about 55 to about 69.

36. The orifice of claim 35, further comprising a plurality of protrusions formed on the orifice seat extending beyond the main support surface thereof in a direction toward the diaphragm for holding the diaphragm off the main support surface and promoting bending of the diaphragm below a predetermined pressure differential, the protrusions engaging an end face of the diaphragm adjacent a radially outer edge thereof and being configured to be fully enveloped by the diaphragm at the predetermined pressure differential.

* * * * *

UNITED STATES PATENT AND TRADEMARK OFFICE
CERTIFICATE OF CORRECTION

PATENT NO.   : 6,390,122 B1
DATED        : May 21, 2002
INVENTOR(S)  : Zhang et al.

It is certified that error appears in the above-identified patent and that said Letters Patent is hereby corrected as shown below:

<u>Title page,</u>
Item [56], References Cited, U.S. PATENT DOCUMENTS, insert the following:
--     2,762,397     9/1956     Miller
       2,834,379     5/1958     Fields
       3,189,125     6/1965     Windsor et al.
       5,409,042     4/1995     Kirchner --.

<u>Column 8,</u>
Line 64, after "promoting" cancel the comma (,).

Signed and Sealed this

Fifteenth Day of October, 2002

*Attest:*

*Attesting Officer*

JAMES E. ROGAN
*Director of the United States Patent and Trademark Office*